Nov. 25, 1930.   W. WÜNSCHE   1,782,835
HOBBLE
Filed Jan. 15, 1929
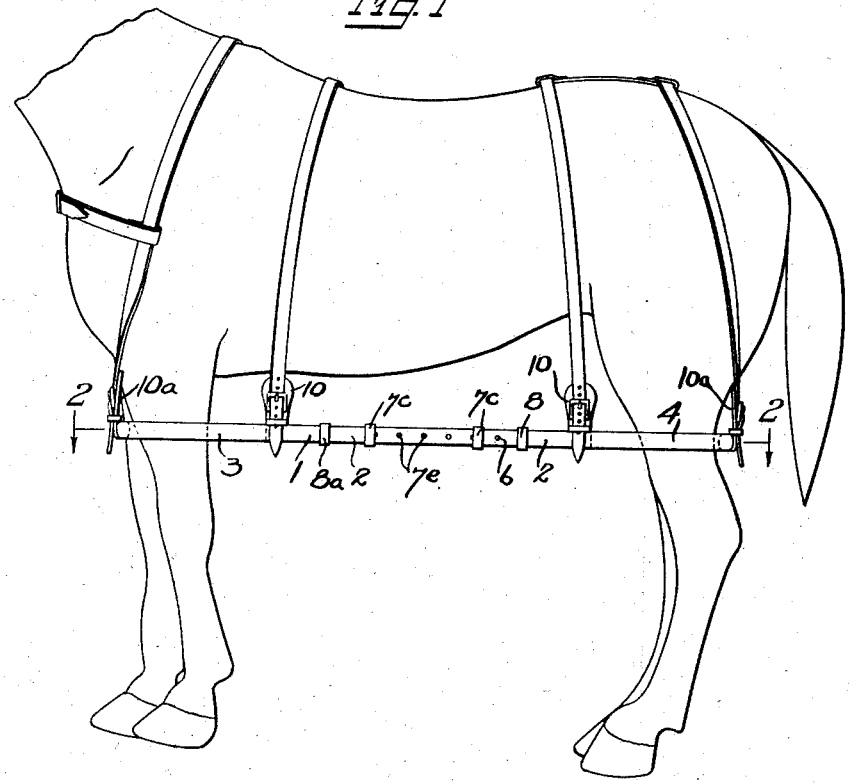
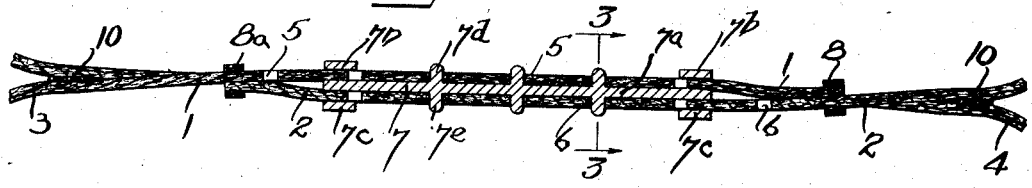
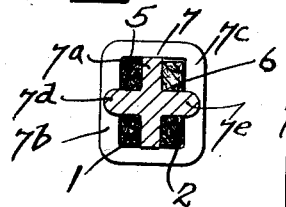 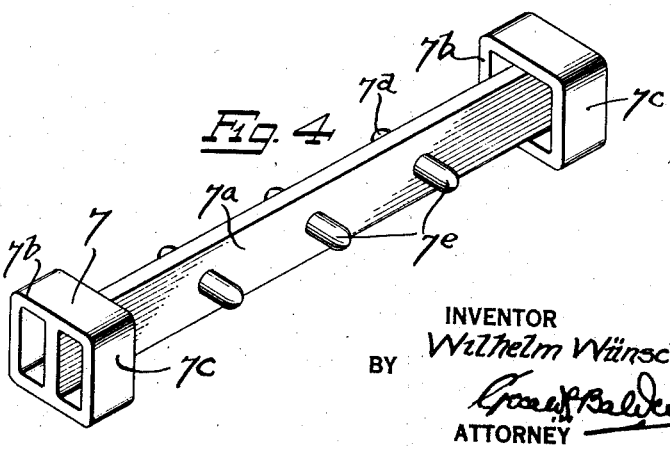
INVENTOR
Wilhelm Wünsche
BY
ATTORNEY Patented Nov. 25, 1930

1,782,835

UNITED STATES PATENT OFFICE

WILHELM WÜNSCHE, OF DETROIT, MICHIGAN

HOBBLE

Application filed January 15, 1929. Serial No. 332,659.

This invention relates to improvements in hobbles, primarily intended for teaching a horse to pace, and consists in an arrangement of two straps each one looped at one of its ends to pass around a horse's leg, and provided towards its opposite end with means for attaching it to a coupling member.

Another object of the invention is to provide a hobble having a coupling member which is simple to manufacture, light in weight, to which either strap end remote from its looped end may be quickly and easily attached or detached, and which is provided with means for varying the distance which either or both loops extend therefrom.

With these and other objects and advantages in view which will become apparent as the specification proceeds, the invention consists in certain novel construction and combination of parts thereinafter more fully described with the aid of the accompanying drawings, in which:

Figure 1 illustrates my improved hobble on a horse.

Figure 2 is a section on the line 2—2 of Figure 1, showing however only the inner ends of the loops.

Figure 3 is a section on the line 3—3 of Figure 2, and

Figure 4 is a perspective view of the coupling member.

Referring to the drawings, 1 and 2 designate two straps having loops 3 and 4 respectively at their ends. Through the straps 1 and 2, towards their ends remote from their loops 3 and 4, a plurality of holes 5 and 6 are provided. 7 designates a coupling member consisting of a plate $7^a$ having a loop $7^b$ at each of its ends which projects laterally on one side, and another loop $7^c$ at each of its ends which projects on the other side. The strap 1 passes through the loops $7^b$ and the strap 2 through the loops $7^c$. Opposed prongs $7^d$ and $7^e$ extend laterally on opposite sides from the plate $7^a$ intermediately of its length. The prongs $7^d$ engage holes 5 in the strap 1 and the prongs $7^e$ engage holes 6 in the strap 2. It will be noted that there are a greater number of holes 5 and 6 than there are prongs $7^d$ and $7^e$ so that the distance the loops 3 and 4 extend beyond the ends of the coupling member 7 may be varied. Sewn or otherwise attached to the ends of the straps 1 and 2 at their ends remote from their loops 3 and 4 are small holding pieces 8 and $8^a$ which also encircle the other straps 2 and 1 respectively, and are slidable along the said other straps to prevent the ends to which they are secured from dangling.

The hobble consisting of the straps 1 and 2 and the coupling member 7 may be supported in any desired manner. In the drawings the method shown includes the provision of buckles 10 and $10^a$ secured between the joints at the ends of the loops 3 and 4.

From the foregoing it will be clearly seen that the straps can be quickly and easily adjusted so that any desired holes 5 and 6 are engaged by the prongs $7^d$ and $7^e$ and that in this matter the over-all length of the hobble can be speedily adjusted. Again the loops $7^b$ and $7^c$ formed at the extremities of the coupling member effectually prevent the accidental disengagement of the straps from the prongs.

While in the foregoing the preferred embodiment of the invention has been described and shown it is understood that the construction of the device is susceptible to such modifications and alterations as fall within the scope of the appended claim.

What I claim is:

A hobble comprising two straps each having a loop formed at one end to encircle a horse's leg, each strap consisting of a single piece at its opposite end, in combination with a coupling member to which the single ends of both straps are so attached that the distance of either or both looped ends from said member may be varied.

WILHELM WÜNSCHE.